United States Patent [19]

Ryoke et al.

[11] Patent Number: 4,880,692
[45] Date of Patent: * Nov. 14, 1989

[54] MAGNETIC RECORDING MEDIUM

[75] Inventors: Katsumi Ryoke; Masatoshi Takahashi; Akihiro Hashimoto; Tsutomu Okita; Kazuko Hanai, all of Kanagawa, Japan

[73] Assignee: Fuji Photo Film Co., Ltd., Kanagawa, Japan

[*] Notice: The portion of the term of this patent subsequent to Nov. 14, 2006 has been disclaimed.

[21] Appl. No.: 171,360

[22] Filed: Mar. 21, 1988

[30] Foreign Application Priority Data

Mar. 19, 1987 [JP] Japan ................... 62-62711

[51] Int. Cl.$^4$ .............................. G11B 5/70
[52] U.S. Cl. ................... 428/323; 427/128; 428/694; 428/900; 428/336
[58] Field of Search ............. 428/694, 900; 427/128, 427/336, 323

[56] References Cited

U.S. PATENT DOCUMENTS

| | | | |
|---|---|---|---|
| 4,368,237 | 1/1983 | Yamada | 428/522 |
| 4,562,117 | 12/1985 | Kikukawa | 428/407 |
| 4,612,244 | 9/1986 | Kaneda | 428/694 |
| 4,694,072 | 3/1987 | Ryoke | 428/695 |
| 4,734,330 | 3/1988 | Oiyama | 428/522 |

Primary Examiner—Paul J. Thibodeau
Attorney, Agent, or Firm—Sughrue, Mion, Zinn, MacPeak & Seas

[57] ABSTRACT

A magnetic recording medium comprising a support having provided on one surface thereof a magnetic recording layer containing ferromagnetic particles dispersed in a binder and on the other surface thereof a backing layer, wherein said binder comprises a vinyl chloride/vinyl acetate copolymer reisn containing at least one group represented by formula (I) or (II):

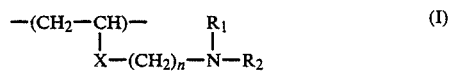

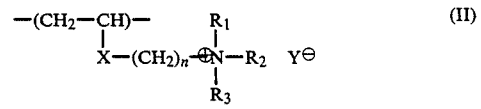

wherein X represents a —COO— group, a —CONH— group, or a —C$_6$H$_4$— group; x represents an integer of from 1 to 10; R$_1$, R$_2$, and R$_3$ each represents a hydrogen atom, an alkyl group having from 1 to 10 carbon atoms, or an alkyl derivative having from 1 to 10 carbon atoms, or R$_1$, R$_2$, and R$_3$ may be combined to each other to form a heterocycric ring; and Y$^\ominus$ represents a halogen atom, ClO$_4^\ominus$, or HgI$_3^\ominus$; or Y$^\ominus$ is bound to R$_2$, R$_2$ represents an alkylene group having from 1 to 10 carbon atoms, and Y$^\ominus$ represents a —COO$^\ominus$ group, an —SO$_3^\ominus$ group, or an —OSO$_3^\ominus$ group.

10 Claims, No Drawings

MAGNETIC RECORDING MEDIUM

FIELD OF THE INVENTION

The present invention relates to a magnetic recording medium, and more particularly it relates to a magnetic recording medium having excellent running durability and which is capable of reducing drop outs (DO).

The magnetic recording medium of the present invention can be used advantageously as a magnetic tape, a magnetic disk, a magnetic sheet and the like.

BACKGROUND OF THE INVENTION

The magnetic recording media essentially comprise a support such as a polyester film having provided thereon a coated film (that is, a magnetic recording layer, which is hereinafter referred to as a magnetic layer) comprising ferromagnetic fine particles (such as $\gamma\text{-}Fe_2O_3$, $Fe_3O_4$, their modified iron oxide, or $CrO_2$) and at least one thermoplastic resin such as a resin comprised of a vinyl chloride/vinyl acetate copolymer, a resin comprised of a vinyl chloride/vinylidene chloride copolymer, a cellulose type resin, an acetal resin, a urethane resin, an acrylonitrile butadiene copolymer type resin or the like.

Acicular fine particles of various ferromagnetic particles are used as the ferromagnetic fine particles in this field of art.

Recently, there has been a great demand for video tapes and audio tapes having higher efficiencies, higher recording densities, and higher reproduced outputs have been strongly desired. In order to achieve these objects, there has been a tendency to reduce the size of the ferromagnetic particles present in these magnetic tapes. Because of the reduction of the size of the ferromagnetic particles and the high magnetic moment of the particles themselves, the particles have a tendency to coagulate. As a result thereof, it has been difficult to homogeneously disperse the particles in a binder.

In order to solve the above technical problems, it has been proposed to improve the affinity of a binder for ferromagnetic particles, the dispersibility of ferromagnetic particles in the binder, and the signal/noise (S/N) ratio of the thus formed magnetic layer by introducing a $PO(OM)_2$ group, an $OPO(OM)_2$ group, an $OP(OM)_2$ group, a $SO_3M$ group, an $OSO_3M$ group, a $COOH$ group and an $OH$ group (in which M represents a hydrogen atom, an alkyl group, an alkali methal atom, an ammonium group, or an amino group) into the molecular chain of the above described resins as binder components (as described, e.g., in Japanese Patent Application (OPI) Nos. 59623/86, 172213/86, 133012/86, 133013/86, 172213/86, and 177524/83) (the term "OPI" used herein means a published unexamined Japanese patent application).

On the other hand, in order to improve dispersibility of ferromagnetic particles and to smooth the surface of a magnetic layer, it is proposed that: ferromagnetic particles are treated with silicon oil; a silane coupling agent capable of reacting with the binder resin is added to the binder; methods using aminosilane compounds or Si compounds; methods using lubricating agent; and ferromagnetic particles are treated with oleic acid. These methods are described, e.g., in U.S. Pat. Nos. 4,309,459, 4,323,464, 4,336,310, 4,332,863, Japanese Patent Application (OPI) Nos. 186302/82, 155517/83, 224102/84, 140527/81, 155703/83, and Japanese Patent Publication No. 1048/82.

However, in the magnetic layer using the above described resins as binders, the dispersibility of the ferromagnetic particles is still poor. Therefore, there are problems in that the surface properties of the magnetic layer are poor, the residual magnetic flux density and the squareness ratio are unsatisfactory, and the magnetic layer is ready to be damaged and powders readily come off, resulting in staining parts of tape running system of a magnetic recording medium while the medium runs.

Further, there is also a tendency for drop outs to increase due to dust and contaminants which are formed by scraping the magnetic layer, backing layer, or support, and stains in the tape running system.

SUMMARY OF THE INVENTION

An object of the present invention is to provide a magnetic recording medium having excellent running durability and excellent characteristics such as a high S/N ratio or a reduced number of drop outs.

Other objects of the present invention will be apparent from the following description.

The present invention has overcome the abovementioned prior art technical problems and has achieved these objects. The present inventors have found that the dispersibility of the ferromagnetic particles can be improved by using an amine-containing vinyl chloride/vinyl acetate copolymer resin as a binder for the magnetic layer in the magnetic recording medium, thereby making the thus formed magnetic layer strong. As a result thereof, the running durability of the magnetic recording medium can be improved, drop outs can be reduced, and the S/N ratio can be also improved.

That is, the present invention relates to a magnetic recording medium comprising a support having provided on one surface thereof a magnetic layer having ferromagnetic particles dispersed in a binder and on the other surface thereof a backing layer, wherein the binder comprises a vinyl chloride/vinyl acetate copolymer resin containing at least one group represented by formula (I) or (II):

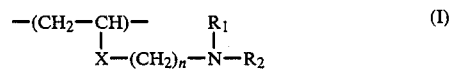

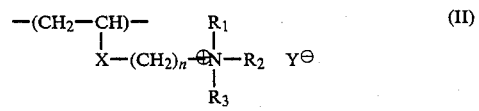

wherein X represents a —COO— group, a —CONH— group, or a —$C_6H_4$— group; n represents an integer of from 1 to 10; $R_1$, $R_2$, and $R_3$ each represents a hydrogen atom, an alkyl group having from 1 to 10 carbon atoms, or an alkyl derivative having from 1 to 10 carbon atoms, or $R_1$, $R_2$, and $R_3$ may be combined to each other to form a heterocyclic ring; and $Y^\ominus$ represents a halogen atom, $ClO_4^\ominus$, or $HgI_3^\ominus$; or $Y^\ominus$ is bound to $R_2$, $R_2$ represents an alkylene group having from 1 to 10 carbon atoms, and $Y^\ominus$ represents a —$COO^\ominus$ group, an —$SO_3^\ominus$ group, an —$OSO_3^\ominus$ group, etc.

DETAILED DESCRIPTION OF THE INVENTION

The present invention will be illustrated in detail as follows.

The magnetic recording medium of the present invention is essentially comprised of a non-magnetic support and a magnetic layer provided thereon.

Examples of the support on which the magnetic layer and the backing layer are provided include polyesters such as polyethylene terephthalate or polyethylene naphthalate; polyolefin such as polypropylene; cellulose derivatives such as cellulose triacetate or cellulose diacetate; vinyl type resins such as polyvinyl chloride; other plastic films such as polycarbonate, polyamide resins, or polysulfonic resins; metal materials such as aluminum or copper; and ceramics such as glass. Those support may be pre-treated by teratment such as a corona discharge treatment, a plasma treatment, an undercoating treatment, a heat treatment, a metal vapor deposition treatment, or an alkaline treatment.

The magnetic layer provided on the support essentially comprises ferromagnetic particles and binders bonding the particles to form a layer.

Examples of the type of ferromagnetic particles which may be used include $\gamma$-$Fe_2O_3$, Co-containing $\gamma$-$Fe_2O_3$, $Fe_3O_4$, Co-containing $Fe_3O_4$, $\gamma$-$FeO_x$ ($1.33 < x \leq 1.50$), Co-containing $\gamma$-$FeO_x$ ($1.33 < x \leq 1.50$), $CrO_2$, Co-Ni-P alloy, Co-Ni-Fe alloy, Fe-Ni-Zn alloy, Ni-Co alloy, Co-Ni-Fe-Be alloy, and plate like hexagonal barium ferrite.

Preferably, these ferromagnetic particles are acicular and have an average long axis length of from about 0.005 to 2 $\mu$m, more preferably from 0.005 to 0.5 $\mu$m, and particularly preferably from 0.01 to 0.3 $\mu$m; a ratio of axis length/axis width of from 1/1 to 50/1, more preferably from 5/1 to 10/1, and particularly preferably from 6/1 to 9/1; and a specific surface area of from about 1 to 70 $m^2/g$, more preferably from 30 to 70 $m^2/g$, and particularly preferably from 40 to 70 $m^2/g$. Prior to dispersion, dispersing agents, lubricating agents, antistatic agents and the like which will be illustrated hereinafter may be dissolved in a solvent, so that the ferromagnetic particles absorbs them by dipping.

The binder which bonds the ferromagnetic particles to form the magnetic layer is the most characteristic feature of the present invention, and comprises a vinyl chloride/vinyl acetate copolymer resin which contains at least one group represented by the above-described formula (I) or (II).

Preferably, X in formulae (I) and (II) represents a —COO— group or a —CONH— group; and $R_1$, $R_2$, and $R_3$ in formulae (I) and (II) each represents a hydrogen atom, an alkyl group having from 1 to 10 carbon atoms, or an alkyl derivative having from 1 to 10 carbon atoms, provided that $R_1$, $R_2$, and $R_3$ do not represent hydrogen atoms at the same $R_2$, and $R_3$ may be combined to each other to form a heterocyclic ring.

The examples of the group represented by formula (I) or (II) are shown below.

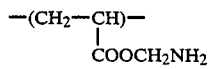

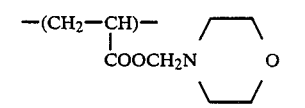

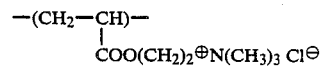

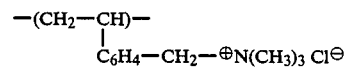

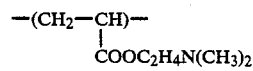

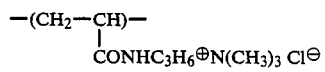

The method for preparing the above binders of the present invention, that is, the method for introducing the group represented by formula (I) or (II) into the vinyl chloride/vinyl acetate copolymer resin include, for example, directly introducing an amino group onto a OH group, a COOH group, a $OCOCH_3$ group, or a Cl atom in the molecule of the vinyl chloride/vinyl acetate copolymer resin using KOH, NaOH, $NaOCH_3$, or HCl as a catalyst schematically indicated below; and introducing an amine containing acrylate into the vinyl chloride/vinyl acetate copolymer resin by polymerizing.

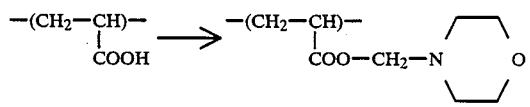

The above described methods are generally conducted by suspension polymerization, solution polymerization, emulsion polymerization, bulk polymerization or the like by using a polymerization initiator such as benzoyl peroxide, lauryl peroxide, azobisisobutyronitrile, etc. Amine modification is conducted when saponification is carried out in a solvent using an alkaline catalyst or an acid catalyst. These synthesis methods are known in the art and methods which can be applied to the preparation of the polymers used in the present invention are disclosed, for example, in *Enka Vinyl (Vinyl Chloride)*, by Masayuki Furuya, published by Nikkan Kogyo Press Co., Ltd.

Examples of the amine compounds used in these methods include a primary amine, a secondary amine, and a tertiary amine, and hetrocyclic amine such as an aliphatic amine, an alicyclic amine, an aromatic amine, or a heterocyclic amine, and more specifically include ethylamine, propylamine, butylamine, cyclohexylamine ethanolamine, naphthylamine, aniline, o-toluidine, diethylamine, dioctylamine, diisobutylamine, diethanolamine, N-methylaniline, trimethylamine, triethylamine, triisobutylamine, tridecylamine, N-methyldiphenylamine, hexamethylene tetramine, triethanolamine, tributylamine, pyridine, $\alpha$-picoline, $\beta$-picoline, $\gamma$-picoline, 2,4-lutidine, quinoline, and morpholine.

It is preferred that the amine containing copolymer resin prepared by the above methods contains from 60 to 95 wt %, more preferably from 85 to 95 wt %, of a vinyl chloride unit, from 0 to 20 wt %, more preferably from 8.5 to 20 wt % of a vinyl acetate unit, and a small amount of other vinyl monomer if necessary based on the total amount of the resin. The amine content of the resin is preferably from 0.01 to 5 wt % in terms of the nitrogen content based on the total amount of the resin. The degree of polymerization of the amine containing resin is preferably from 100 to 700, more preferably from 150 to 500.

Examples of the vinyl monomer which can be used in the amine containing copolymer resin in a small amount include vinyl alcohl, a compound represented by formula:

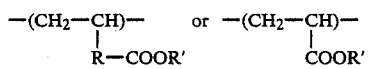

wherein R represents $(CH_2)_n$ (wherein n represents an integer of from 0 to 5); and R' represents a hydrogen atom or an alkyl group having from 1 to 5 carbon atoms. These monomers are preferably used in an amount of from 0 to 5 wt % based on the total amount of the resin.

When the amount of the vinyl chloride units is too small, the physical strength of the magnetic layer decreases, and when the amount thereof is too large, the solubility in solvents decreases, which is unfavorable for preparing a coating solution. When the amount of the vinyl acetate units is too small, the dispersibility of the magnetic particles decreases and the compatibility with polyurethane resins also decreases. On the other hand, when the amount of the vinyl acetate units is too large, both the physical strength and the heat-stability decreases.

When the amount of the amine-modified vinyl units is too small, both the dispersibility of the magnetic particles and the smoothness of the magnetic layer decrease. When the unit thereof is too large, both dispersibility and smoothness decrease and solubility also decreases, and thus the amine containing resin becomes unsuitable as a binder. When the average degree of polymerization of the above-described copolymer resin is too small, the physical strength of the magnetic layer decreases and the durability of the magnetic recording medium also decreases. On the other hand, when the average degree of polymerization is too large, the viscosity of the coating solution having a predetermined resin concentration is too high, which is unfavorable in view of handling the coating operation.

When the amine compound used for synthesizing the amine containing resin of the present invention is simply added to the compositions of the magnetic layer composed of ferromagnetic particles and a conventional binder and dispersed therein to form a magnetic layer without causing a reaction, the dispersibility of the ferromagnetic particles and the smoothness of the surface of the magnetic layer are slightly improved, but under these circumstances the dispersibility deteriorates with the passage of time. Therefore, the object of the present invention generally cannot be attained without reacting the amine with the resin.

When the above-described amine-modified resin is used as a binder, other binders may be used in combination therewith in an amount which is the same as or smaller than the amount of the amine-modified resin. Such binders include polyurethane resins, nitrocellulose, polyester resins, epoxy resins, polyamide resins, phenol resins, alkyl resins, polyvinyl butyral resins, and various polymer or copolymer resins such as polymers of acrylates, methacrylates, styrenes, acrylonitriles, butadienes, ethylenes, propylenes, or vinylidene chlorides. Particularly, polyurethane resins, epoxy resins, and nitrocelluloses are preferred.

It is desired that a polyisocyanate type hardening agent is used in addition to the above components. Suitable hardening agents include a polyfunctional isocyanate, a urethane prepolymer having isocyanate groups at both ends, and the like, which are available under the trade name of "Collonate L", "Collonate HL", "Collonate 2030", "Collonate 2031", "Collonate 2036", "Collonate 3015", "Collonate 2014", "Millionate MR", "Millionate MTL", "Dult Sec 1350", "Dult Sec 2170", and "Dult Sec 2280" manufactured by Nippon Polyurethane Industries Co., Ltd., and "Desmodule L" manufactured by Bayer Co., Ltd. in West Germany. The preferred additive amount of the hardening agent is from 5 to 40 parts by weight based on 100 parts by weight of a binder.

In the coating solution for forming a magnetic layer, the binder may be used in an amount of from 15 to 100 parts by weight based on 100 parts by weight of ferromagnetic particles.

In one embodiment of the present invention, based on the total weight of the binder, the amine containing resin may be included in the binder in an amount of from 10 to 60 wt %, a urethane resin or an epoxy resin may be included in the binder in an amount of from 10 to 90 wt %, a polyisocyanate may be included in the binder in an amount of from 5 to 40 wt %, and a polyamide may be included in the binder in an amount of from 0 to 50 wt %. It is particularly preferred that the amine containing resin is included in an amount of from 25 to 50 wt %, a urethane resins or epoxy resin is included in an amount of from 20 to 65 wt %, a polyisocyanate is included in an amount of from 10 to 35 wt %, and a polyamide is included in an amount of from 0 to 30 wt % in the composition of the binder.

Additives such as lubricating agents, abrasive agents, dispersing agents, antistatic agents, or rust preventing agents can be added to the coating solution for the magnetic layer depending on various purposes.

Examples of the lubricating agents include saturated or unsaturated higher fatty acids, fatty acid esters, higher fatty acid amides, higher alcohols and silicon oil, graphite, molybdenum disulfide, tungsten disulfide, boron nitride, fluorinated graphite, alcohol fluoride, polyolefin, polyglycol, alkyl phosphate, polyphenyl ether, fatty acid, fatty acid ester and fatty acid alcohols. These lubricating agents may be used in an amount of from 0.05 to 20 parts by weight based on 100 parts by weight of the binder.

Examples of the abrasive agents include α-alumina, fused alumina, chromium oxide, corundum, α-iron oxide, silicon nitride, boron nitride, silicon carbide, molybdenum carbide, boron carbide, tungsten carbide, diatom earth, and dolomite which have a Moh's hardness of or more and an average particle size of from 0.005 to 5 μm. These abrasive agents may be used alone or in combination and are used in an amount of from 0.01 to 20 parts by weight based on 100 parts by weight of the binder.

Examples of the dispersing agents include fatty acids having from 10 to 22 carbon atoms such as caprylic acid, capric acid, lauric acid, myristic acid, palmitic acid, stearic acid, oleic acid, elaidic acid, linolic acid, linolenic acid and stearolic acid, alkali metals or alkali earth metal salts of those fatty acids, metal soaps such as copper or lead soap, lecithin, higher alcohol, and sulfate or phosphates of higher alcohol. These dispersing agents may be used alone or in combination and may be used in an amount of from 0.005 to 20 parts by weight based on 100 parts by weight of the binder.

Examples of the antistatic agents include electroconductive particles such as graphite, carbon black or carbon black graphite polymer, natural surface active agents such as saponin, nonionic surface active agents such as alkylene oxide type agents, glycerine type agents, glycidol type agents, polyhydric alcohol type agents or polyhydric alcohol esters, cationic surface active agents such as higher alkyl amine, cyclic amine, hidantoin derivatives, amide amines, ester amides, quaternary ammonium salts, pyridine, other heterocyclic rings, phosphoniums or sulphoniums, anionic surface active agents such as carboxylic acid, sulfonic acids, phosphoric acid or agents having an acid group such as a sulfuric acid ester group or a phosphoric acid ester group and amphoteric surface active agents such as amino acids, aminosulfonic acids, sulfonic acid ester of aminoalcohol or alkylbetain type agents. These surface active agents may be used alone or in combination and may be used in an amount of from 0.01 to 10 parts by weight based on 100 parts by weight of ferromagnetic particles. These antistatic agents may be used, in some cases, to improve dispersibility and magnetic properties, as well as to improve lubricating properties or as a coating aid, in addition to the above described purposes.

The above-described various additives may be added to the coating solution for forming the magnetic layer, or may be directly coated or sprayed on the surface of the magnetic layer as a solution of organic solvents or as a dispersion, after the magnetic layer has dried.

The coating solution for forming the magnetic layer is prepared generally by mixing the above described components, that is, dissolving the binder in a solvent which is capable of dissolving the binder, adding ferromagnetic particles to the resulting binder solution, stirring, and homogeneously dispersing the solution.

Examples of the solvents which may be used for preparing the coating solution for the magnetic layer include ketone type solvents such as acetone, methyl ethyl ketone, methyl isobutyl ketone, cyclohexanone, isophorone, or tetrahydrofuran; alcohol type solvents such as methanol, ethanol, propanol, butanol, isobutyl alcohol, isopropyl alcohol, or methyl hexanol; ester type solvents such as methyl acetate, ethyl acetate, butyl acetate, isobutyl acetate, isopropyl acetate, ethyl lactate, or monoethyl ether of glycol acetate; glycol ether type solvents such as ether, glycol dimethyl ether, glycol monomethyl ether, or dioxane; aromatic hydrocarbon type solvents such as benzene, tolene, xylene, cresol, chlorobenzene, or styrene; chlorinated hydrocarbon type solvents such as methylene chloride, ethylene chloride, carbon tetrachloride, chloroform, ethylene chlorohydrin, or dichlorobenzene; N,N-dimethylformamide; and hexane; etc.

The solvents are selected so as to completely dissolve the ingredients which should be dissolved. When those solvents are used in combination, the amounts of each solvent are optionally selected. The solvents should be selected so that they do not deteriorate the desired characteristics of the ferromagnetic particles.

A two-roll mill, a three roll mill, a ball mill, a pebble mill, a tron mill, sand grinder, an attritor, a high speed impeller, a dispersing device, a high speed stone mill, a high speed impact mill, a disper, a kneader, a high speed mixer, a ribbon blender, a cokneader, an intensible mixer, a tumbler, a blender, a disperser, a homogenizer, an ultrasonic dispersing device or the like may be used for dissolving and dispersing the components in the solvent.

After the dispersing step, the coating solution for the magnetic layer is coated on a support by various coating methods such as, for example, an air doctor coating method, a blade coating method, an air knife coating method, a squeeze coating method an impregnating method, a reverse roll coating method, a transfer roll coating method, a gravure coating method, a cast coating method, or a spray coating method. The coated amount is preferably such an amount that the dry thickness of the magnetic layer is from 1 to 7 $\mu$m.

The magnetic layer thus coated on a support by one of various method is generally subjected to magnetic orientation while drying, so that the ferromagnetic particles contained in the magnetic layer will have a particular orientation after drying. As methods for coating, drying, and magnetic orientation of the magnetic layer, conventional technologies may be used.

A backing layer may be provided on the surface of the support opposite to that occupied by the magnetic layer. The coating solution for forming a backing layer may contain binders, organic solvents, inorganic or organic lubricating agents which are used in the coating solution for forming the magnetic layer. The lubricating agents may be fine particles having an average particle size of 0.8 $\mu$m or less, preferably 0.4 $\mu$m or less. The preferred mixing ratio of the binder and the lubricating agent in a backing layer is 1:0.1 to 1:4 (weight ratio).

A coating solution for the backing layer may be prepared by homogeneously dispersing the organic or inorganic fine particles of a lubricating agent in an solution of an organic solvent for a binder, similar to the preparation of the coating solution for the magnetic layer.

The thickness of the coated layers of a magnetic recording medium should be as thin as possible to increase the recording density per unit volume of the medium and the thickness of the backing layer is preferably from 0.6 to 2.0 $\mu$m.

Similar to the preparation of the magnetic layer, the backing layer is coated on a surface of a support opposite to the surface occupied by the magnetic layer, and the coating is dried. The methods for preparing, coating, and drying the coating solution for a backing layer may be the same as those used for applying the magnetic layer. In this instance, the order in which the magnetic layer and the backing layer are applied may be optionally determined by those who are skilled in this art. In any case, it is believed that the magnetic recording medium of the present invention can easily be prepared by those skilled in this industry using conventional technologies.

The present invention will be illustrated in more detail by the following Examples and Comparative Examples. In Examples and Comparative Examples, parts are by weight.

COMPARATIVE EXAMPLE 1

A coating solution for a magnetic layer having the following composition was coated on a polyethylene terephthalate film having an 18 $\mu$m thickness, subjected to magnetic orientation using cobalt magnets and dried at a temperature from 20° to 110° C. for 15 seconds to obtain a magnetic layer having a 6 μm thickness.

| Preparation of a coating solution for the magnetic layer: | |
|---|---|
| Composition: | |
| Co—containing γ-Fe$_2$O$_3$ particles (nitrogen absorbing specific surface area 30 m$^2$/g, coercive force Hc = 650 Oe) | 300 parts |
| Vinyl chloride/vinyl acetate copolymer resin "VMCH" (a trade name manufactured by Union Carbide Co., Ltd.) | 38 parts |
| Polyurethane "Crisvon 7209" (a trade name manufactured by DAINIPPON INK AND CHEMICALS, INC.) | 16 parts |
| Carbon black "Vulcan SC 72" (a trade name, manufactured by Cabot Co., Ltd. average particle size: 30 mμ) | 15 parts |
| Abrasive agent α-alumina "Hit 100" (a trade name, manufactured by Sumitomo Chemical Co., Ltd.) | 15 parts |
| Octyl myristate | 3 parts |
| Myristic acid | 3 parts |
| Butyl acetate | 600 parts |
| Methyl ethyl ketone | 300 parts |

The above described components were put in a ball mill and were sufficiently mixed and dispersed for 50 hours and 20 parts of polyisocyanate "Collonate 2030" (a tradename, manufactured by Nippon Polyurethane Industries Co., Ltd.) was added thereto to prepare a coating solution for a magnetic layer.

On the other hand, a coating solution for a backing layer having the following composition was coated on a surface of the support opposite to the surface occupied by the magnetic layer and was dried at a temperature of from 20° to 100° C. for 10 seconds to obtain a backing layer having 2 μm thickness.

| Coating solution for a backing layer" | |
|---|---|
| Carbon black "HS 100" (average particle size 50 mμ) | 100 parts |
| "Crisvon 7209" (a trade name, manufactured by DAINIPPON INK AND CHEMICALS, INC.) | 16 parts |
| Resin of copolymer of vinyl chloride and vinyl acetate "VMCH" (a trade name, manufactured by Union Carbide Co., Ltd.) | 30 parts |
| Silicone oil "KF-69" (a trade name, manufactured by Shin-etsu Chemical Co., Ltd.) | 0.1 part |
| Methyl ethyl ketone | 700 parts |
| Butyl acetate | 300 parts |

The above composition was mixed, kneaded, and dispersed in a ball mill and then 20 parts of polyisocyanate "Collonate 2030" was added thereto and uniformly mixed and dispersed to obtain a coating solution for the magnetic layer.

Then, the resulting magnetic layer was subjected to a calendering treatment, slit to a 1 inch width to obtain a magnetic recording tape which was identified as Comparative Sample No. 1.

EXAMPLE 1

The same procedures as in Comparative Example 1 were repeated to obtain a magnetic recording tape, which was identified as Sample No. 1, except that a vinyl chloride/vinyl acetate copolymer resin (vinyl chloride unit: 88 wt %; vinyl acetate unit: 12 wt %; amine containing vinyl group: 0.05 wt %; degree of polymerization: 400) was used instead of the vinyl chloride/vinyl acetate copolymer resin "VMCH" in the coating solution for the magnetic

COMPARATIVE EXAMPLE 2

The same procedures as in Comparative Example 1 were repeated to obtain a magnetic recording tape, which was identified as Comparative Sample No. 2, except that a vinyl chloride/vinyl acetate copolymer resin (vinyl chloride unit: 93 wt %; vinyl acetate unit: 1 wt %/vinyl alcohol unit: 6 wt %; amine content: 0.05 wt %; degree of polymerization: 400) was used instead of vinyl chloride/vinyl acetate copolymer resin "VMCH" in the coating solution used in the preparation of the magnetic recording medium of Comparative Example 1.)

COMPARATIVE EXAMPLE 3

The same procedures as in Comparative Example 1 were repeated to obtain a magnetic recording tape except that a vinyl chloride/vinyl acetate copolymer resin (Vinyl chloride unit: 90 wt %; vinyl acetate unit: 5 wt %; vinyl alcohol unit: 5 wt %; degree of polymerization: 440) was used instead of the vinyl chloride/vinyl acetate copolymer resin "VMCH" in the composition of a coating solution used in the preparation of the magnetic recording medium of Comparative Example 1. This magnetic tape was identified as Comparative Sample No. 3.

COMPARATIVE EXAMPLE 4

The same procedures as in Comparative Example 1 were repeated to prepare a magnetic recording tape except that a vinyl chloride/vinyl alcohol copolymer resin (vinyl chloride unit: 94 wt %/vinyl alcohol unit: 6 wt %; amine containing vinyl group: 0.05 wt %; degree of polymerization: 400) was used instead of the vinyl chloride/vinyl acetate copolymer "VMCH" in the coating solution used in the preparation of the magnetic recording medium of Comparative Example 1. The thus prepared tape was identified as Comparative Sample No. 4.

The thus obtained tapes were evaluated and the results are shown in Table 1.

MEASURING METHOD (1) Gloss of the surface of the magnetic layer:

Gloss was measured based on "JIS-Z 8741" and shown in terms of relative values when the gloss of a surface of a glass having a refractive index of 1.567 at an angle of coincidence of 45° is 100%.

(2) Young's modulus:

Young's modulus of the whole magnetic recording tape and that of the magnetic recording tape with the backing layer removed were obtained using a stress and distortion measuring apparatus.

(3) Screen chroma noise:

Screen signals of image signals 30 IRE superimposed with carrier waves amplitude of 100% were recorded at a standard recording current. These signals were reproduced through a high frequency filter of 1 kHz and a low frequency filter of 500 kHz and the AM component of the chroma noise in the reproduced signals was measured using a noise measuring device. The screen chroma noise of the samples is shown in terms of relative decibel (dB) values when the chroma noise of Sample 1 of the present invention is a standard dB value.

(4) Drop Out:

Drop out is shown by the number of drop outs per minute which occurred after the repeated usage of 10 passes. Drop out was counted by a drop out counter when the reproduced output level decreased by 16 dB or more for $5 \times 10^{-6}$ sec or more.

(5) Permalloy $T_2/T_1$:

Permalloy $T_2/T_1$ is shown in terms of the number of passes until $T_2$ exceeds 1,000 g upon running repeatedly at $T_1$ of 200 g with a permalloy head.

TABLE 1

| Samples | gloss | Young's modulus (kg/mm$^2$) | Chroma noise (dB) | Number of drop out per minute | permalloy $T_2/T_1$ |
|---|---|---|---|---|---|
| Sample 1 | 150 | 460 | 0 | 20 | 30 |
| Comparative Sample 1 | 159 | 640 | 0 | 70 | 31 |
| Comparative Sample 2 | 151 | 640 | 0 | 60 | 30 |
| Comparative Sample 3 | 159 | 620 | 0 | 70 | 15 |
| Comparative Sample 4 | 150 | 550 | 0 | 60 | 15 |

As clear from the results shown in Table 1, Sample No. 1 of the present invention exhibited a slightly low gloss, but had excellent drop out characteristic and permalloy characteristic without deteriorating screen chroma noise.

On the other hand, Sample Nos. 1 through 4 in Comparative Examples had poor drop out characteristic and Sample Nos. 3 and 4 had poor permalloy characteristic.

The binder used in the present invention has excellent dispersibility even in the much finer ferromagnetic particles. Therefore, the magnetic recording medium using the binder has much more improved durability, excellent S/N ratio, and reduced number of drop out, and thus, is very effective as a magnetic recording medium for high density recording.

While the invention has been described in detail and with reference to specific examples thereof, it will be apparent to one skilled in the art that various changes and modifications can be made therein without departing from the spirit and scope thereof.

What is claimed is;

1. A magnetic recording medium comprising a support having provided on one surface thereof a magnetic recording layer containing ferromagnetic particles dispersed in a binder and on the other surface thereof a backing layer, wherein said binder comprises a vinyl chloride/vinyl acetate copolymer resin containing at least one group represented by formula (I) or (II):

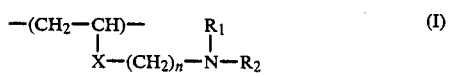

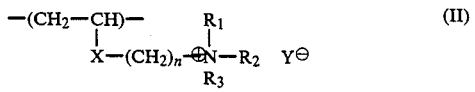

wherein X represents a —COO— group, a —CONH— group, or a —C$_6$H$_4$— group; n represents an integer of from 1 to 10; R$_1$, R$_2$, and R$_3$ each represents a hydrogen atom, an alkyl group having from 1 to 10 carbon atoms, or an alkyl derivative having from 1 to 10 carbon atoms, or R$_1$, R$_2$ and R$_3$ may be combined to each other to form a heterocyclic ring; and Y$^\ominus$ represents a halogen atom, ClO$_4^\ominus$, or HgI$_3^\ominus$; or Y$^\ominus$ is bound to R$_2$, R$_2$ represents an alkylene group having from 1 to 10 carbon atoms, and Y$^\ominus$ represents a —COO$^\ominus$ group, an —SO$_3^\ominus$ group, or an —OSO$_3^\ominus$ group; and wherein said copolymer resin contains from 60 to 95 wt % of a vinyl chloride unit and greater than 0 wt % of a vinyl acetate unit based on the total amount of said polymer resin; and wherein the amine content of said copolymer resin is from 0.01 to 5 wt % in terms of the nitrogen content based on the total amount of said copolymer resin; and wherein said copolymer resin has a degree of polymerization of from 100 to 700.

2. A magnetic recording medium as claimed in claim 1, wherein X represents a —COO— group or a —CONH— group; and R$_1$, R$_2$, and R$_3$ each represents a hydrogen atom, an alkyl group having from 1 to 10 carbon atoms, or an alkyl derivative having from 1 to 10 carbon atoms, provided that R$_1$, R$_2$, and R$_3$ do not represent hydrogen atoms at the same time, or R$_1$, R$_2$, and R$_3$ may be combined to each other to form a heterocyclic ring.

3. A magnetic recording medium as claimed in claim 1, said copolymer resin contains from 85 to 95 wt % of a vinyl chloride unit and from 8.5 to 20 wt % of a vinyl acetate unit based on the total amount of said copolymer resin.

4. A magnetic recording medium as claimed in claim 1, said copolymer resin has a degree of polymerization of from 150 to 500.

5. A magnetic recording medium as claimed in claim 1, said binder comprises from 10 to 60 wt % of said copolymer resin, from 10 to 90 wt % of a urethane resin or an epoxy resin, from 5 to 40 wt % of a polyisocyanate, and from 0 to 50 wt % of a polyamide.

6. A magnetic recording medium as claimed in claim 5, said binder comprises from 25 to 50 wt % of said copolymer resin, from 20 to 65 wt % of a urethane resin or an epoxy resin, from 10 to 35 wt % of a polyisocyanate, and from 0 to 30 wt % of a polyamide.

7. A magnetic recording medium as claimed in claim 1, said ferromagnetic particles are acicular and have an average long axis length of from about 0.005 to 2 μm, a ratio of axis length/axis width of from 1/1 to 50/1, and a specific surface area of from about 1 to 70 m$^2$/g.

8. A magnetic recording medium as claimed in claim 7, said ferromagnetic particles are acicular and have an average long axis length of from 0.005 to 0.5 μm, a ratio of axis length/axis width of from 5/1 to 10/1, and a specific surface area of from 30 to 70 m$^2$/g.

9. A magnetic recording medium as claimed in claim 8, said ferromagnetic particles are acicular and have an average long axis length of from 0.01 to 0.3 μm, a ratio of axis length/axis width of from 6/1 to 9/1, and a specific surface area of from 40 to 70 m$^2$/g. medium as claimed in 10. A magnetic recording medium as claimed in claim 1, said magnetic recording layer has a thickness of from 1 to 7 μm.

* * * * *